US011010639B2

(12) United States Patent
Coogan et al.

(10) Patent No.: US 11,010,639 B2
(45) Date of Patent: May 18, 2021

(54) IN-SCENE MULTI-ANGLE SURFACE-SPECIFIC SIGNATURE GENERATION AND EXPLOITATION

(71) Applicant: Raytheon Company, Waltham, MA (US)

(72) Inventors: John J. Coogan, Bedford, TX (US); Stephen J. Schiller, La Mirada, CA (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 16/279,212

(22) Filed: Feb. 19, 2019

(65) Prior Publication Data
US 2019/0258899 A1   Aug. 22, 2019

Related U.S. Application Data

(60) Provisional application No. 62/632,257, filed on Feb. 19, 2018.

(51) Int. Cl.
*G06K 9/62* (2006.01)
*G06T 7/514* (2017.01)
(Continued)

(52) U.S. Cl.
CPC ....... *G06K 9/6256* (2013.01); *G06K 9/00657* (2013.01); *G06T 7/514* (2017.01);
(Continued)

(58) Field of Classification Search
CPC ....... G06K 2009/00644; G06K 9/6255; G06K 9/6256; G06T 7/50; G06T 7/514;
(Continued)

(56) References Cited

U.S. PATENT DOCUMENTS 8,158,929 B2    4/2012  Schiller
8,363,979 B2 *  1/2013  Abraham ........... G01B 11/2755
                                                    382/285
(Continued)

OTHER PUBLICATIONS

Morton, Douglas C., et al., "Amazon forests maintain consistent canopy structure and greenness during the dry season", Nature vol. 506, (Feb. 13, 2014), 221-224.
(Continued)

*Primary Examiner* — Nirav G Patel
*Assistant Examiner* — Stephen M Brinich
(74) *Attorney, Agent, or Firm* — Schwegman Lundberg & Woessner P.A.

(57) ABSTRACT

An angularly-dependent reflectance of a surface of an object is measured. Images are collected by a sensor at different sensor geometries and different light-source geometries. A point cloud is generated. The point cloud includes a location of a point, spectral band intensity values for the point, an azimuth and an elevation of the sensor, and an azimuth and an elevation of a light source. Raw pixel intensities of the object and surroundings of the object are converted to a surface reflectance of the object using specular array calibration (SPARC) targets. A three-dimensional (3D) location of each point in the point cloud is projected back to each image using metadata from the plurality of images, and spectral band values are assigned to each value in the point cloud, thereby resulting in a multi-angle spectral reflectance data set. A multi-angle surface-specific signature (MASS) is fitted to the multi-angle spectral reflectance data set, and the multi-angle surface-specific signature of the object and the surroundings of the object are stored into a spectral database. The spectral database is mined to find one or more of spatial and temporal anomalies in the plurality of images and patterns and correlations of the multi-angle surface-specific signature.

20 Claims, 11 Drawing Sheets

(51) Int. Cl.
*G06T 7/521* (2017.01)
*G06K 9/00* (2006.01)

(52) U.S. Cl.
CPC .... *G06T 7/521* (2017.01); *G06T 2207/10024* (2013.01); *G06T 2207/20081* (2013.01); *G06T 2207/30188* (2013.01)

(58) Field of Classification Search
CPC ............. G06T 7/521; G06T 7/529; G06T 2207/10024; G06T 2207/20081
USPC ............. 382/100, 103, 108, 285, 206
See application file for complete search history.

(56) References Cited

U.S. PATENT DOCUMENTS

| | | |
|---|---|---|
| 8,507,843 B2 | 8/2013 | Silny et al. |
| 8,515,716 B2 | 8/2013 | Ingram et al. |
| 8,532,958 B2 | 9/2013 | Ingram et al. |
| 8,824,779 B1* | 9/2014 | Smyth ............... G06T 7/593 382/154 |
| 8,983,797 B2 | 3/2015 | Ingram et al. |
| 9,068,886 B2 | 6/2015 | Silny et al. |
| 9,317,968 B2 | 4/2016 | Raif |
| 9,372,119 B2 | 6/2016 | Silny et al. |
| 9,430,872 B2 | 8/2016 | Raif et al. |
| 2019/0154809 A1* | 5/2019 | Akkaya ............... G01S 17/42 |

OTHER PUBLICATIONS

Roy, David P., et al., "Examination of Sentinel-2A multi-spectral instrument (MSI) reflectance anisotropy and the suitability of a general method to normalize MSI reflectance to nadir BRDF adjusted reflectance", Remote Sensing of Environment 199, (2017), 25-38.

* cited by examiner

IN-SCENE MULTI-ANGLE SURFACE-SPECIFIC SIGNATURE GENERATION AND EXPLOITATION

RELATED APPLICATIONS

The present application claims priority to U.S. Serial Application No. 62/632,257, filed Feb. 19, 2018, the content of which is incorporated herein by reference in its entirety.

TECHNICAL FIELD

The present disclosure relates to the generation and use of multi-angle surface specific signatures.

BACKGROUND

Automated change detection of objects requires the measurement of features of those objects that are independent of collector devices and collection conditions. Therefore, any attempt to process a time series of geospatial data must account for the type and/or location of the sensor, the location and condition of the object feature itself, and the time of day. If these effects are ignored, upstream processing is compromised because the real signal is hidden by collection artifacts and it is not possible to aggregate multiple collections into a single database. A specific problem is the dynamic relationship between observed reflectivity and collection geometry.

As illustrated in FIGS. 1A, 1B, and 1C, the reflectivity of real world objects varies with the geometrical collection conditions. This relates to what is referred to as the bidirectional reflectance distribution function (BRDF). If not properly addressed, these BRDF effects confound automated change detection. Two recent efforts exemplify the issue.

As reported by Morton, remotely sensed vegetation data from the Amazon River basin were being misinterpreted because the image analysts did not consider the impact of collection geometry ("Amazon forests maintain consistent canopy structure and greenness during the dry season" Douglas C. Morton, et al., Nature 506 (2014) pp 221-224). Researchers had assumed that the observed feature (canopy reflectance) was behaving as if the spectral signature did not vary with the location of the sun or sensor (that is, they assumed the feature was Lambertian). Lambertian reflectance is the property that defines an ideal "matte" or diffusely reflecting surface. The apparent brightness of a Lambertian surface to an observer is the same regardless of the observer's angle of view. The reflectance of a Non-Lambertian surface varies with the geometry of the light source or sources and the observer. That analysis resulted in confusion as the remote measurements contradicted field measurements. Subsequent image analysis that considered the location of the sun and sensor (a non-Lambertian approach) reached conclusions on leaf moisture levels that were confirmed with field measurements.

Similarly, as reported by Roy et al., long term remote sensing models built for the European Space Agency's Sentinal-2A system have determined that directional reflectance effects cannot be ignored ("Examination of Sentinal-2A multi-spectral instrument (MSI) reflectance anisotropy and the suitability of a general method to normalize MSI reflectance to nadir BRDF adjusted reflectance" David P. Roy, et al., Remote Sensing and the Environment, 199 (2017) pp 25-38). New tools to enable "reliable sensor data comparisons" and detection of "surface change through space and/or time" are being constructed. The typical collection geometries (~20 degrees off nadir) and target features (terrestrial surfaces) that motivated these efforts are much less impacted by BRDF effects than man-made structures.

If it is assumed a surface generates the same spectral reflectance for all sun/sensor positions, a way is needed to model how that reflectance varies with the location of the sun and sensor. In essence, this is what bi-directional reflectance is. The two directions that make it "bi" directional are the direction of the sun and the direction of the sensor. There are other sources of light that can make BRDF measurements from remote image data problematic such as light from the hemispherical sky dome. In some instances, the sky dome illumination can be ignored. In other instances, it must be included as a hemispherical directional distribution function (HDRF) combined with a BRDF from the sun to describe the total incident illumination. This combination results in a multi-angle surface specific signature (MASS) that is more realistic than BRDF alone when modeling natural field conditions. Since the bi-directional reflectance can be very complicated, databases do not store all the possible values for the reflectance. Rather, a mathematical function is stored that permits a calculation of the reflectance for any combination of sun and sensor position. That mathematical function is called the bi-directional reflectance distribution function, or BRDF.

In practice, with a rapidly growing small satellite industry deploying constellations of low cost imaging sensors, the quality and exploitability of data products will play a critical role in who grows and who doesn't. As a result, absolute calibration and inter-calibration of satellite instruments are critical for reliable, accurate, and consistent measurements over time. Industry growth has been driven by a stable of paying customers eager to extract value from refreshed satellite imagery from multiple satellites that are affordable and that optimize value added potential. A significant part of keeping the cost down has typically been the elimination of on-board calibration systems forcing small satellite developers to rely on vicarious calibration methods to maintain optimal information content that users are expecting. Robust techniques are required to ensure that observations from different instruments maintain traceability and can be normalized to a common scale for achieving seamless physics-based applications.

DETAILED DESCRIPTION

Figure 1A:
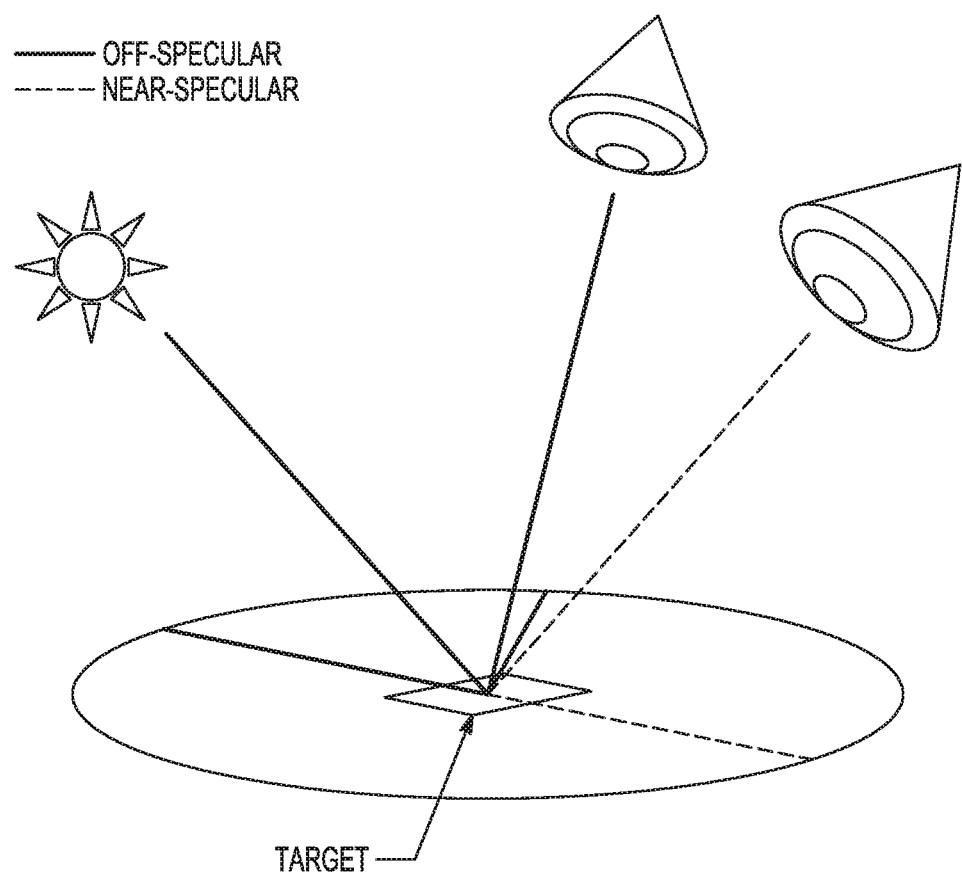
FIG. 1A illustrates how the reflectivity of real world objects varies with collection geometry.

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

This disclosure relates to the utility of multi-image spectral signatures for bidirectional reflectance distribution function (BRDF) estimation using commercial collectors. More specifically, a novel system is disclosed that improves upon the BRDF, and generates a multi-angle surface-specific signature (MASS). The BRDF can be thought of as a subset of the MASS, and depending on the context of the disclosure, one or both may be applicable in a particular situation. Embodiments of the present disclosure extend remote sensing the same way that computer graphics modernized animation. This permits the augmentation of 3D remote processing with state of the art computer vision and machine learning. The measurement of a material's (or feature's) BRDF usually requires a series of lab measurements. In contrast, one or more embodiments of the present disclosure of the MASS use a combination of a specular array for radiometric calibration (SPARC) process for image surface reflectance calibration and passive 3D (P3D) point cloud data in which the BRDF of real features, or the MASS, can be incorporated. This allows a prediction of how the feature will appear to a sensor throughout the day or across multiple collections. The MASS is therefore an essential capability for identifying real change during a persistent observation, and/or an alternate way of doing spectral material identification, that could be useful for automated or machine learning analysis.

The present disclosure relates to a characterization approach to automate the generation of multi-angle surface-specific (MASS) spectral signatures that as noted are similar to bidirectional reflectance distribution functions (BRDF) and populate databases that contain those signatures to maximize operationally significant trending and change detection. The measurement of MASS invariant geospatial features/signatures, like BRDF, is a necessary precursor to the creation of normalcy models and machine-based analytics that identify anomalies. An embodiment provides the ability to aggregate spectral and spatial data collected from the full range of commercial and government sources (overhead, airborne and low-cost drones) into a single big-data ready database, suitable for automated analysis using artificial intelligence and data mining tools.

An embodiment leverages existing tools within passive 3D (P3D) point clouds. While it is known that P3D data sets can contribute to mission planning in denied areas, it has not been demonstrated that the P3D process preserves fundamental collection metadata that enables automated analysis of spectral features extracted from multiple images in a real world environment. There are many more dimensions of information in the P3D data sets than x, y and z. P3D data sets also contain collection metadata, feature-registered spectral pixel data, and updated positioning metadata. An embodiment exploits this information to engineer spectral data sets for automated machine and big data analytics. In an embodiment, the creation of the P3D model is just the beginning. The P3D generation capability preserves fundamental collection metadata that enables novel approaches for fusing multiple images into a single data set. In addition to detailed P3D scene information, this dataset contains collection metadata, feature-registered spectral pixel data, and updated positioning metadata. As noted, there are many more dimensions of information than the usual x, y and z. These embodiments are a data preparation effort to engineer data sets created by P3D processing for machine learning based analytics. U.S. Pat. No. 9,430,872 relates to the selection of images in a P3D process, and U.S. Pat. No. 9,317,968 relates to how a correlator works in a P3D process. The correlator locates a specific feature in multiple images. U.S. Pat. Nos. 9,430,872 and 9,317,968 are incorporated herein by reference in their entireties.

An embodiment relates to a technique for achieving calibration and performance equalization of a constellation of imaging sensors within their operational environment that includes space-based and airborne systems imaging from visible to mid-wave infrared (MWIR) wavelengths. The SPARC method is an adaptable ground based system that uses convex mirrors to create small reference targets capturing radiometric, spectral, spatial, and temporal characteristics of individual sensors for transforming them into a unified earth-monitoring sensor system. An embodiment relates to automatically identifying non-Lambertian features via the P3D process, radiometrically generating an in-scene bidirectional reflectance distribution function (BRDF) or MASS, and improving the accuracy of trending and highlighting man-made materials that may be reported as a false change.

The same data needed to define a non-Lambertian signature is needed to support a BRDF or MASS measurement. More specifically, this disclosure combines the capabilities of a vicarious calibration process and point clouds to create BRDF-like MASS signatures of features of real world objects. The vicarious calibration process uses a specular array for radiometric calibration (SPARC), which is described in detail in U.S. Pat. No. 8,158,929, the contents of which are incorporated herein by reference. As noted, the point clouds can be referred to as P3D point clouds, and the point clouds include points where each point contains both spectral intensities and collection geometries. An embodiment mines the point cloud to create a multi-angle surface-specific spectral signature, uses the SPARC process to calibrate those measurements, and then fits a BRDF-like MASS to the measured points. The process creates both a library of material signatures enabling advanced feature analysis (e.g. denial and deception (D&D)) and/or a mask of non-Lambertian features within a scene, thereby enabling improved change detection across collections of images of real world objects with variable lighting conditions. The disclosed embodiments improve upon earlier non-Lambertian tools because these earlier tools are difficult to use, and existing field-based BRDF measurements are not accurate. These earlier processes required manual selection of pixels from multiple images, the careful registration of multiple images, and accurate measurements of the atmosphere at the time of collection. Earlier non-Lambertian tools required both manual selection of pixels from multiple images and careful registration of multiple images. These tools were labor-intensive and difficult to use. To improve upon these prior processes, an embodiment leverages P3D processes, discussed in detail herein, that automate both registration (via photogrammetric bundle adjustment, further described herein) and pixel/feature selection (the correlation process that identifies features present in multiple images) to automate the process.

One or more embodiments combine existing capabilities of the SPARC process (vicarious calibration) and P3D (point clouds where each point contains both spectral intensities and collection geometries of every image used to locate the point) to create BRDF-like MASS signatures of real features. The point cloud is mined to create a multi-angle surface-specific spectral signature, the SPARC (Spectral Array Radiometric Calibration) process is used to calibrate (radiometrically and spatially) those measurements, and then a BRDF-like MASS is fitted to the measured points. This process creates both a library of material signatures enabling advanced feature analysis and/or a mask of non-Lambertian features within a scene enabling improved change detection across collections with variable lighting conditions. As one of skill in the art knows, BRDF measurements require a series of labor intensive lab measurements.

The P3D process can create data sets with over one billion points, which includes mapping between each point and the specific spectral characteristics of the pixels correlated to locate that point. An embodiment using SPARC reference targets exploits these internal maps (from point to pixel to metadata) to create multi-angle surface-specific spectral signatures optimized not for display like in animation applications, but for machine-based data mining and non-Lambertian spectral analytics. This helps a move "from pictures to pixels to data."

P3D point clouds, like typical point clouds, include the x, y, and z location of each feature found in multiple images, and $\Delta x$, $\Delta y$, and $\Delta z$ error metrics for the location of each point. Additionally, a P3D point cloud includes data relating to pixel intensity value relating to multiple bands, such as red (or PAN), green, blue, or any additional band. The P3D data also contain collector metadata, such as azimuth ($\Phi$) and elevation ($\Theta$) of the sensor. The P3D data further contains environmental data, such as azimuth ($\Phi$) and elevation ($\Theta$) of the sun.

The details of the P3D process are as follows. The P3D process starts with rigorous photogrammetric tools to bundle adjust a collection of earth observation (EO) images. Registration tools are applied to find and correlate discovered features in three dimensions, and community error models are applied to the output point cloud. The use of rigorous methods allows for direct mapping from each 3D point to the 2D pixels containing both spectral and temporal GEOINT, which enables the P3D process to generate dense point clouds from as few as two images.

This also means that, unlike LiDAR, each point in the derived point cloud contains spectral band information from the source imagery, which enables novel processing options that complement and expand non-Lambertian analytics. The resulting point clouds contain collection metadata, spatial, and spectral information. The P3D point clouds embrace the error standards developed for LiDAR and, in fact, extend these models to support a new, generic, point cloud error model that confirms that the extracted 3D features have geo-coordinates with improved horizontal and vertical accuracy over the original independent image sources.

Working in three dimensions, data fusion becomes possible (i.e. image pixels from different images under different collection characteristics are correctly registered to each other since the algorithm performs a 3D geometric correction and identifies their 3D locations), and the extracted 3D features are ready for integration into multi-image spectral libraries.

Figure 3A:
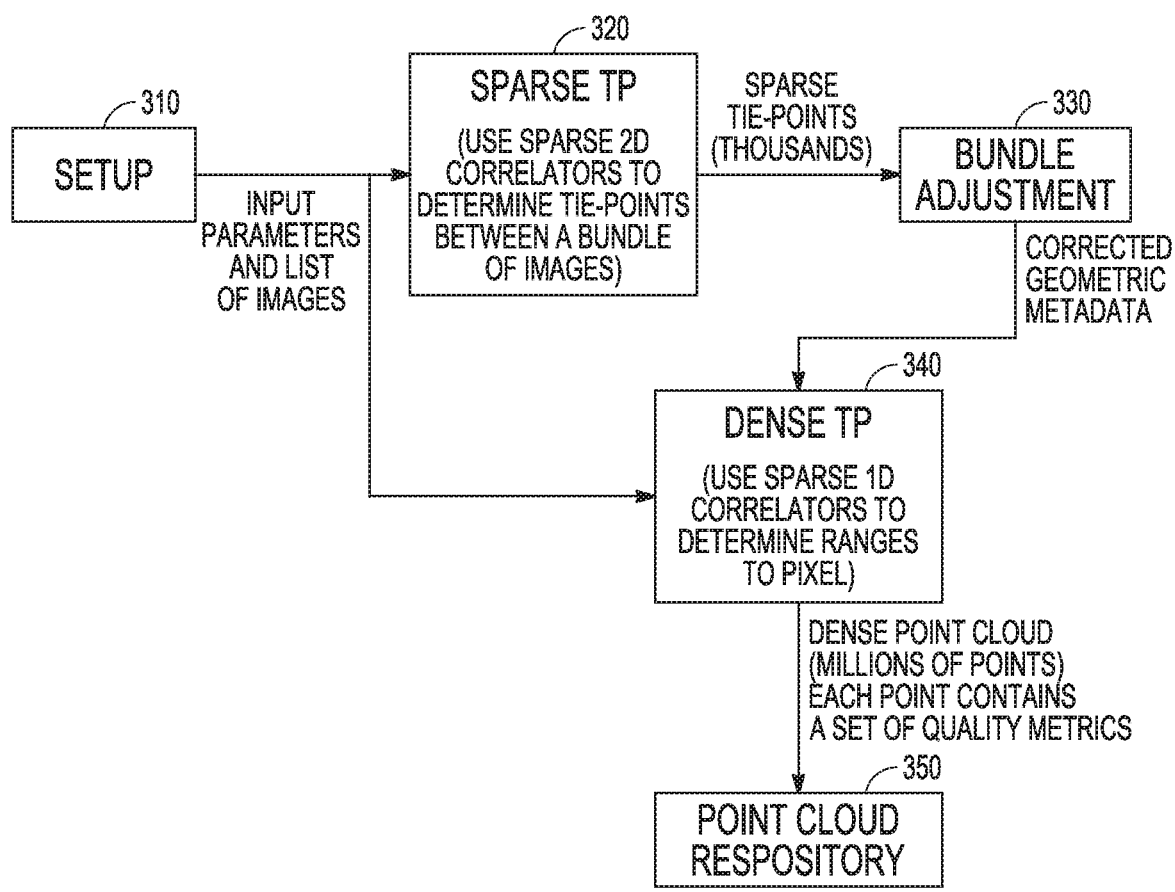
FIG. 3A is a block diagram illustrating a passive three-dimensional (P3D) point cloud process.

The P3D process includes several independent modules, which are illustrated in FIG. 3A and discussed below. These modules, in their order in the workflow, can include setup, sparse tie point generation, bundle adjustment, dense tie point (point cloud) generation, pre-filtering, local Z-clip filtering ("FLT" file), gridded point cloud generation ("GRD" file), and an optional colorization.

As illustrated in FIG. 3A, the P3D process starts with rigorous photogrammetric tools to bundle adjust a collection of EO images. Registration tools are applied to find and correlate discovered features in three dimensions, and community error models are applied to the output point cloud. The use of rigorous methods allows for direct mapping from each 3D point to the 2D pixels containing both spectral and temporal GEOINT, as noted, this enables the P3D process to generate dense point clouds from as few as two images. This also means that, unlike LiDAR, each point in the derived point cloud contains spectral information from the source imagery, which enables processing options that complement and expand other analytics. The resulting point clouds containing collection metadata, spatial, and spectral information can be used to match 3D points to geometric primitives as well as develop texture maps for derived surfaces. The P3D point clouds embrace the error standards developed for LiDAR and, in fact, can extend these models to support a new, generic, point cloud error model that confirms that the extracted 3D features have geo-coordinates with improved horizontal and vertical accuracy over the original independent image sources. Working in three dimensions, data fusion becomes possible (i.e. image pixels from different images under different collection characteristics are correctly registered to each other since the algorithm performs a 3D geometric correction and identifies their 3D locations) and that the extracted 3D features are ready for integration into public and private/proprietary databases.

Referring specifically to FIG. 3A, the setup step 310 proceeds as follows. A set of input parameters (video image processing requirements (VIPR) parameters) and a set of input images are provided. The quality of the resulting P3D point cloud is highly dependent on these input values. Therefore, proper selection can be important. Input values can be summarized as follows.

For the input parameters, there is the tiepoint generation strategy, which defines a set of registration pyramid levels. For each level, the image pyramid level is defined, the suggested tiepoint search area and template window size are defined, the grid spacing between correlations are defined, the type of correlator to use is defined, and the types of blunder rejection to use are defined. These values are based on the type and number of images being used, and are typically set to default values for the default image cluster case.

Bundle adjustment parameters, such as convergence tolerances, blundering parameters, and the adjustable parameters in the geometric correction are also defined. These are default values that are rarely changed. Server processing parameters are defined, such as the number of threads to use for each step. Post-processing parameters are defined, which define the quality threshold for both metric and Z-clip filtration. These are default values that must occasionally be tuned for certain test cases. The optimal values for P3D will vary with the goal—while sharing the same basics workflow and set of algorithms, P3D for the generation point clouds optimized for MASS will have its own, distinct, set of optimal inputs and settings.

Regarding the input imagery, a set of one or more image clusters includes one "reference" image and one or more "non-reference" images. The reference image defines the perspective from which the point cloud will be built for that cluster. Multiple clusters are used to build a point cloud from multiple perspectives. There are two input imagery strategies—independent clusters and co-collection clusters.

Independent clusters are clusters that are built from imagery that is collected independently from each other. For example, in a default case, the input imagery set is one cluster of five images. One cluster of five images is the optimal trade-off between point cloud quality (high signal to noise ratio) and processing time. Smaller clusters have significantly more noise, and larger clusters take much longer to process. In the optimal case of the default imagery set, the reference image is within a few degrees of nadir, and the four non-reference images surround it with a 3-15 degree convergence angle with respect to the reference. This provides opportunity to colorize buildings from all four sides using a single cluster. Also, it minimizes occluded regions caused by buildings. Sometimes, one cluster of more than five images is used, with five images dedicated to point cloud generation, and the full five or more set used to increase geometric diversity in the bundle adjustment and colorization. The simplest input imagery set is one cluster of two images, separated by a 3-15 degree convergence angle. This set frequently has blunders (noise) caused by ambiguous feature matches along the epipolar line. To reduce noise, a more conservative tiepoint generation strategy is often used, particularly by increasing the template window sizes to reduce feature ambiguities. More complex input imagery sets can be built, such as N clusters of 4-8 images. More complex sets are not as well understood; thus they are currently not automated and must be built with operator involvement. Complex imagery sets are often useful to model "urban canyon" scenes, where there is no single geometry that can properly model the entire scene.

The sparse tiepoint generation (320) setup step provides a list of image clusters and input command parameters for generating tiepoints between those images. In a setup, imagery is read from the file system and image pyramids are built (reduced resolution imagery). Rational polynomial coefficients (RPC) are read from the file system, and a Line-of-Site (LOS) vector grid is built to use for interpolated ray intersections. Configuration values are read from the input parameters to determine how to generate the tiepoints. If available, a digital elevation map (DEM) is read for the geographic region covered by these images. Using the LOS vector grid and the current best knowledge of the elevation (either single RPC value, single user provided value, or DEM based), a grid of geometric tiepoints is built that maps from locations in the reference image to the non-reference images. At this point, the mapping is geometric only and prone to error. The sources of error in the original mapping are LOS errors caused by errors in the original RPCs, and elevation errors caused by unknowns in the elevation map.

The image-to-image mappings are improved by use of image-to-image tiepoints. For each registration level in the command input parameters, the following steps are executed. Each non-reference image is resampled into the reference image space using the current image-to-image mapping grid. A convolution kernel is applied (based on sensor and geometry characteristics) to one or both images to achieve equivalent resolution. Edge magnitude images and phase images are extracted from the imagery. A two-dimensional FFT-optimized Normalized Cross Correlation is run over a grid of points on the edge magnitude and phase images. The correlation scores are used to refine the current image-to-image mapping. The statistics of the correlation scores and the image-to-image mapping are analyzed, and "weaker" correlation scores, "weaker" figure of metrics, and geometric outliers are rejected. The refined mappings are combined for all non-reference images. Very large geometric outliers (that indicate a tiepoint blunder) are rejected, but smaller geometric outliers that could have been caused by errors in the input RPCs are not rejected. A hole-filling algorithm is used to fill vacancies in the refined image-to-image mapping caused by the blunder rejection steps. Typically 8-12 registration levels are performed. Each registration level operates at a higher resolution level on a denser grid with a smaller correlation search area. This allows the system to handle both large errors and smaller errors. For spare tiepoint generation, the results of the last registration level are searched for the highest quality 1-to-N tiepoints that tie the single reference image to the N non-reference images. Ideally, the best 1000 1-to-N tiepoints are chosen, where all 1000 points have a high-confidence match to all images in the set. These tiepoints are then exported for use by the bundle adjustment process.

In the bundle adjustment step at 330, the sparse tiepoints from the previous step 320 are analyzed geometrically to refine the original RPCs into new RPCs that minimize the relative error between the images, and can also reduce absolute geolocation errors. For the purpose of P3D workflow, the primary output of the bundle adjustment is RPCs with minimized relative error, which allows the subsequent processing to make certain assumptions to improve both quality and timelines for the final P3D point cloud.

Bundle adjustment essentially relates to minimizing the reprojection error between the image locations of observed and predicted image points, which is expressed as the sum of squares of a large number of nonlinear, real-valued functions. Thus, the minimization is achieved using nonlinear least-squares algorithms. Bundle adjustment amounts to jointly refining a set of initial camera and structure parameter estimates for finding the set of parameters that most accurately predict the locations of the observed points in the set of available images.

In the dense tiepoint generation step (340), tiepoints are generated in an identical overall flow as the sparse tiepoint generation step, but with the following key differences. The RPCs used for building the LOS vector grid is the new, corrected RPCs rather than the original RPCs. For each reference/non-reference pair, an affine rotation of both the reference image and non-reference image is performed so that the epipolar line runs horizontally. Since all tiepoint deltas will lie in the epipolar direction, a one-dimensional correlation is run for all points. This increases the speed of the algorithm and reduces blunders. Edge magnitudes and phases are not extracted. All tiepoints are calculated using the original intensity imagery. The geometric outlier rejection step is much more aggressive, rejecting both large and small geometric outliers, with the assumption that all geometric outliers are the result of tiepoint blunders.

The result of the dense tiepoint generation is a set of 1-to-N tiepoints that resolve to an XYZ location in 3D space. The tiepoint density is typically one tiepoint for every 2×2 reference pixels. Thus, the final result is a point cloud from the reference image's perspective with a resolution approximately half as dense as the original reference image. The output is very similar to a LiDAR range map, in which there is a 2-D image with a range value for each post.

Finally, if multiple clusters are used, a separate point cloud is generated for each reference image. These point clouds are then merged into a single cloud. For each point in the cloud, the following metrics are captured. First, a 3D XYZ location of the point is captured. Second, a mean correlation score for the 1-to-N tiepoints contributing to the XYZ point is captured Third, a mean figure-of-merit for the 1-to-N tiepoint contributing to the XYZ point is captured. Fourth, a mean intensity variance for the image chips that contributed to the 1-to-N tiepoint is captured. Fifth, a number of image rays used in the 1-to-N tiepoint (i.e. 1+N) is captured. Sixth, a geometric error metric, which is the mean Euclidian distance between the 3D multi-ray intersection point and each of the contributing rays, divided by the square root of the number of rays that contributed to that point is captured. Seventh, a reference image intensity at that point, along with the reference line/sample location of that point, is captured.

As noted, existing non-Lambertian tools are difficult to use, and existing field-based BRDF measurements are not accurate. Both of these processes required manual selection of pixels from multiple images, the careful registration of multiple images, knowledge of illumination sources, and accurate measurements of the atmosphere at the time of collection. As a result, non-Lambertian material ID (NLMID) and the BRDF measurements required for NLMID are only used under "laboratory conditions" or for animation, with the exception of U.S. Pat. Nos. 8,532,958, 8,515,716, and 8,983,797, all of which are incorporated by reference. In both commercial and military operations, ubiquitous sensing and 3D scene models require automated systems that are easier to use.

The P3D point cloud and the SPARC process automates and thereby improves these earlier processes. Since a "point" in the point cloud is formed when the same feature is found (i.e., correlated via rays between a sensor and an object) in multiple images, the P3D output extracts the required, multi-collected data. Images have already been registered as a result of the bundle adjust process (aligning all features in an image so that they are geospatially and three-dimensionally located). The same data in the P3D point cloud are needed to define the non-Lambertian signatures needed to support a BRDF-like MASS measurement.

A typical P3D outfile contains, for each point

| | |
|---|---|
| X, Y, Z | location of feature found in multiple images |
| ΔX, ΔY, ΔZ | error metrics for the location of each point (not used here) |

Plus, for each image where the point/feature was found:

| | |
|---|---|
| Band 1 value | pixel value (intensity, DN, . . . ) of the first band (e.g. red or PAN) |
| Band 2 value | pixel value (intensity, DN, . . . ) of the second band (e.g. green) |
| Band 3 value | pixel value (intensity, DN, . . . ) of the third band (e.g. blue) |
| Band j value | pixel value (intensity, DN, . . . ) of the $j^{th}$ band |
| Collection metadata | azimuth ($\varphi$) and elevation ($\theta$) of sensor and sun |

Figure 3B:
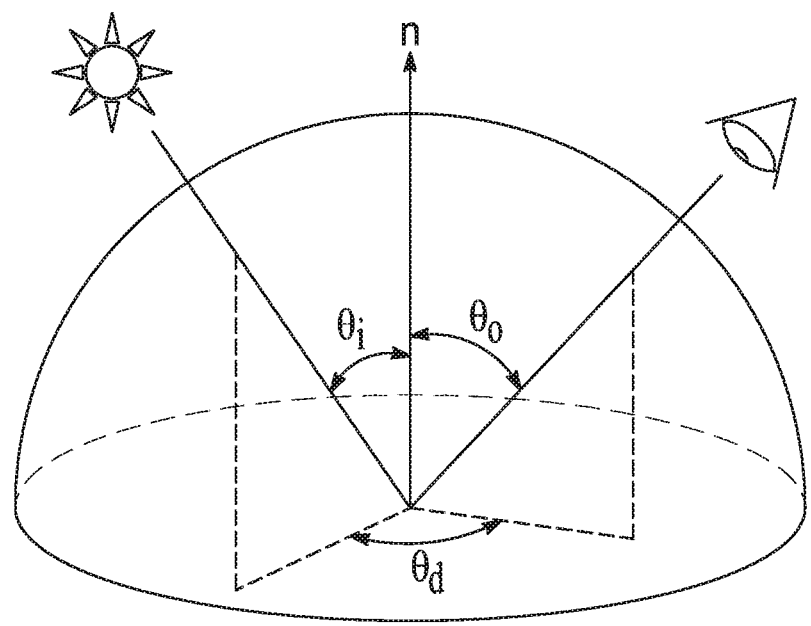
FIG. 3B illustrates the data and geometries that are available in a P3D point cloud.

These features, and the interrelationships of these features, are illustrated in FIG. 3B. The "feature" that is being characterized can be a single, ideal, facet of material, such as a vent on a rooftop, or a complex structure, such as an automobile that consists of headlights, tires, windshields, etc. SPARC allows for the estimation of collection specific atmospherics and reflectance calibration without the need to custom design collections.

In short, embodiments of this disclosure reuse capabilities of P3D and the SPARC process to solve a different problem. Output from the P3D point cloud provides the required raw material, in an easy to access (and automatable) format, and the SPARC process allows for the estimation of collection specific atmospherics and calibration to absolute surface reflectance without the need to custom design collections.

Figure 1B:
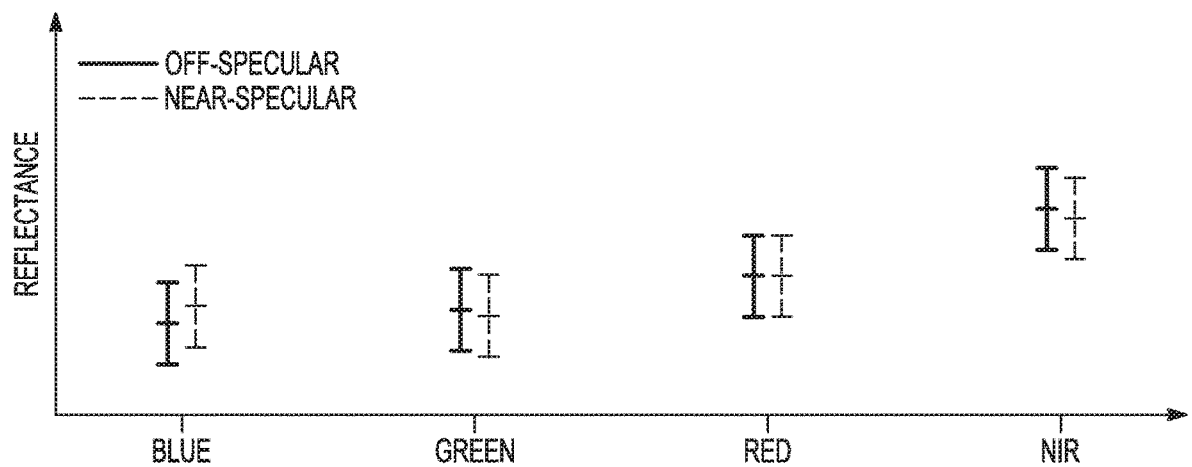
FIG. 1B illustrates the reflectance of a Lambertian object.
Figure 1C:
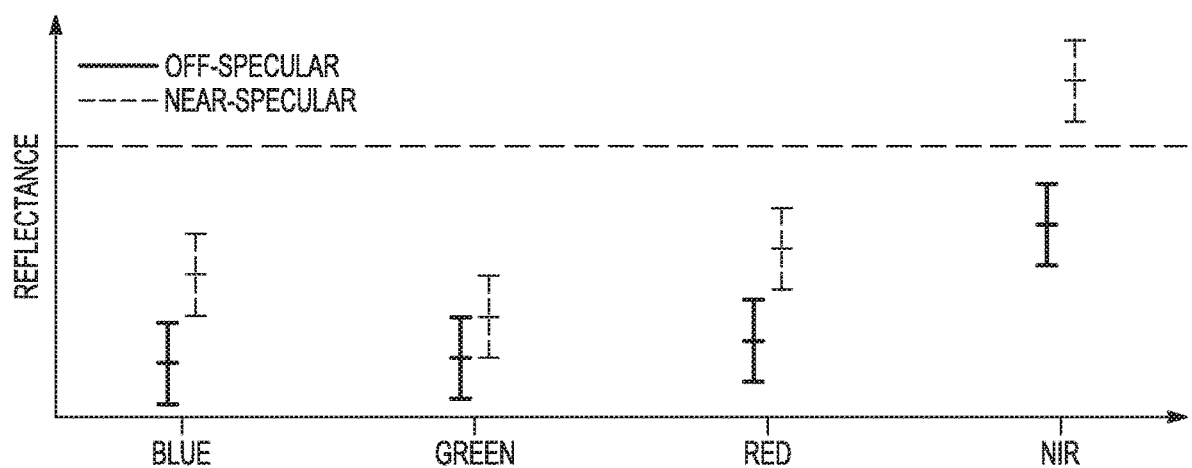
FIG. 1C illustrates the reflectance of a non-Lambertian object.

Turning now more specifically to surface reflectance, the manner in which a surface reflects or emits radiation can be generally categorized as either Lambertian or non-Lambertian. A Lambertian surface scatters electromagnetic radiation equally in all directions, without regard to the direction of illumination. Thus, its reflectance is generally isotropic or the same in all directions. A non-Lambertian surface does not scatter incident electromagnetic radiation equally in all directions. See FIGS. 1A, 1B, and IC. Examples of non-Lambertian surfaces include those that are backscattering, meaning that the light scatters predominantly toward the illumination source; forward scattering, meaning scattering predominantly in directions away from the illumination source; and specular, meaning reflecting the illumination source like a mirror. Many man-made objects or targets exhibit non-Lambertian reflectance.

A SPARC (Specular Array Radiometric Calibration) system permits spectral, spatial, and radiometric calibration of on-orbit sensors. Based on a novel use of spherical mirrors to create a ground based "star", the system can be applied to a wide range of over-head collection systems. Compared to extended ground targets, a SPARC system is demonstrably easier to use. It is suitable for automation, applicable to a wide range of missions including the measurement of system point spread functions. A SPARC system is an enabler for the coordinated collection of data from small satellite constellations. While faster revisit rates are part of the story told for a satellite constellation, the reality is that variations from sensor to sensor (as well as over time with the same sensor) limit the type of analytics that take advantage of these revisit rates. SPARC allows data collected from every sensor to go into a single data base with a common traceability path.

Figure 2:
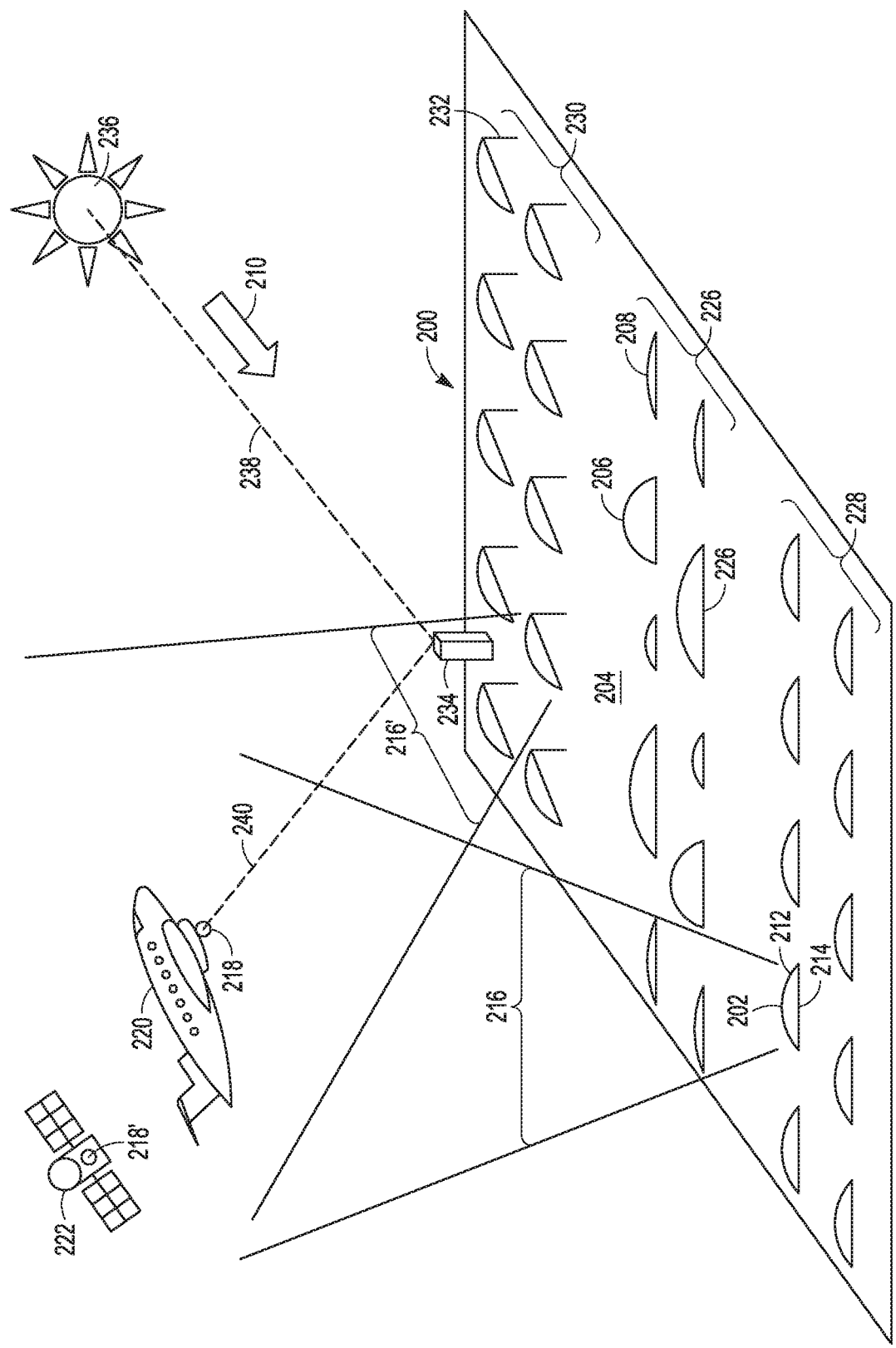
FIG. 2 illustrates a perspective view of a specular array for radiometric calibration ("SPARC").

More specifically, and referring to FIG. 2, which illustrates a perspective view of a specular array for radiometric calibration ("SPARC") 200. The SPARC 200 includes a plurality of spherical mirrors, of which mirror 202 is exemplary, disposed upon a uniform low reflectance background 204 so as to provide an array of reflective points upon the ground. At least two points, e.g., mirrors 206 and 208, reflect different intensities of directly incident sunlight 210 due to a different radius of curvature. In at least one embodiment, the background is an asphalt pavement. In at least one alternative embodiment, the background is a substantially uniform grassy area. Each mirror, e.g., mirror 202 has a radius of curvature 212 and a diameter 214. The radius of curvature 212 and the diameter 214 provide a field of regard 216. Collectively, all mirrors of the SPARC 200 provide a collective minimum calibratable field of regard when a sensor 218 is calibrated. For example, when a sensor 218 is on board an aircraft 220 or sensor 218' is on board a satellite 222, and such sensor is within the minimum calibratable field of regard, calibration can occur using all features of the array. It should be understood that as is further discussed herein, the mirrors of SPARC 200 may have different radii of curvature and diameter dimensions, and as such different individual fields of regard. In at least one embodiment, wherein all mirrors are collectively utilized for calibration purposes, it is appreciated that the collective minimum calibratable field of regard is determined by the smallest field of regard produced by a member of the SPARC 200 array. Each mirror 202 may be concave or convex. However, in at least one embodiment, the mirrors 202 are convex. As domed structures, i.e., rising from the plane of the ground, the convex shape may have certain advantages over concave spherical mirrors, such as but not limited to, a reduced likelihood to collect rain, snow, leaves or other debris that might adversely affect the reflective properties of the mirror 202 and concave mirrors can create a real focal point that can be hazardous.

In at least one embodiment, the spherical mirrors are placed into subgroups. More specifically, in at least one embodiment there is a first subgroup 224 and a second subgroup 226. In at least one embodiment, the mirrors of the first subgroup 224 are about identical as shown. Further, as shown in the second subgroup 226, in at least one embodiment, at least two mirrors have different radius of curvature, e.g., mirrors 206 and 208. Further, in the second subgroup 226, in at least one embodiment at least two mirrors have different diameters, e.g., mirrors 206 and 228. Generally, the mirrors of SPARC 200 each provide a point source target, as recorded by the sensor, which is collectively an array of reflective points. More specifically, in at least one embodiment, and as discussed below, the mirrors 202 of the first subgroup 224 provide for calibration of spatial phasing and the mirrors of the second subgroup 226 provide point sources of varying intensity to fully calibrate the dynamic range of the sensor. It is also appreciated that in at least one embodiment, SPARC 200 is structured and arranged to orient the field of regard 216' and therefore the collective minimum calibratable field of regard towards a sensor 218 is calibrated. This is shown in FIG. 2 by exemplary subgroup 230. Such orientation is, in one embodiment, achieved by raising one side of each mirror, such as by an adjustable or static foot. In at least one embodiment each mirror, or as discussed herein each panel of mirrors, is fitted with an actuator 232 structured and arranged to actuate the specular array of mirrors and dynamically orient the collective minimum calibratable field of regard towards a sensor 218 to be calibrated including active tracking, continually aligning the field-of-regard with the sensor as it moves across the sky. Further, in at least one embodiment, SPARC 200 includes at least one information gatherer 234 structured and arranged to gather atmospheric information. More specifically, in one embodiment information gatherer 234 is a solar radiometer operable to determine transmittance ($\tau_1$) of the atmosphere between the mirrors of SPARC 200 and the sun 236 indicated by dotted line 238, and used to calculate the transmittance ($\tau_2$) of the atmosphere between the mirrors of SPARC 200 and sensor 218 to be calibrated indicated by dotted line 240.

In at least one embodiment, information gatherer 234 also includes a sensor locator structured and arranged to determine the location of the sensor to be calibrated (218 in actuality), and in at least one preferred embodiment, the location information regarding the sensor is provided in the metadata that comes from the sensor 218 system itself. Therefore, in at least one embodiment, the element of the information gatherer 234 that determines the location of the sensor 218 is not so much truly determining the location, as it is simply reading and interpreting the information provided directly by the sensor 218 itself. In at least one alternative embodiment, a separate sensor locator, such as radar or triangulation, may be employed. Such location and transmittance information is utilized in determining the intensity of the reflected directly incident sunlight as provided to the sensors to be calibrated (218 and 218'). In SPARC 200, mirrors 202 advantageously provide "solar stars" at the ground site seen as the virtual image of the sun produced by each mirror. The solar irradiance (Watts/m2) at the time of incidence is converted to an intensity source (Watt/str) that illuminates any surface or sensor input aperture with a reflected intensity that follows the inverse square law. The intensities for each mirror 202 are known over all illumination and view angles making them very versatile for multiple sensors, multiple view angles, and multiple atmospheric conditions.

With the foregoing as background, the process of this disclosure combines existing capabilities of the SPARC calibration process and P3D point clouds (point clouds where each point contains both spectral intensities and collection geometries) to create BRDF-like MASS signatures of features of real world targets and/or objects. The process mines the point cloud to create a multi-angle spectral signature, uses the SPARC process to calibrate those measurements, and then fits a BRDF-like MASS to the measured points. As previously noted, this process can create both a library of material signatures that can be aggregated over multiple collections and platforms for feature analysis, and/or generate a mask of non-Lambertian features within a scene enabling improved change detection across collections with variable lighting conditions.

An embodiment relates to the generation of activity-based data by converting commercial image pixels into an invariant feature/signature database, which is ready for and can be used for automated change detection. Since these features are derived from geolocated 3D points and correlated pixels, the signatures are ready to form spatially-tagged time series of geospatial data (as shapefiles or elements of a MySQL database), or to integrate with text-based databases (extracted from the social media using natural language processing, NLP). This allows automated correlation of 'activity' over time by tracking trends, detecting change, and highlighting anomalies. Many trendable activities such as construction and urban expansion, refugee movement, littoral terrain monitoring for operations, and economic state are associated with "observables" characterized by man-made, non-Lambertian, and/or specular materials which are the subject of this disclosure.

In an embodiment, a database enhances current automated change detection algorithms by rejecting false detections using spatial masks or spectral filters extracted from the database. Creation of a single database from disparate sensors and different times of day can be used to help upstream services efficiently analyze large volumes of geospatial data. This signature information can also be integrated into existing analytics or used by the GEOINT community including Structured Object Management (SOM) or Activity Based Intelligence (ABI) services.

The P3D tool set, discussed in detail above, and the basis for one or more embodiments, can be found on cloud architectures. The disclosed capabilities can be deployed as services operating as close as possible to data libraries. The use of the P3D cloud provides several output products and/or services.

A first product or service is an extraction of a multi-image feature-specific spectral signature from the P3D. Signatures and metadata that are saved from the P3D process make up the basic dataset used for all subsequent processing. These datasets can contain a diverse set of images from a number of different sensors, different collection geometries, weather conditions, times of day, calendar days, etc.

A second product or service is a re-optimization of P3D correlators to identify and characterize points for BRDF-like extraction. The selection metrics can be changed to favor sun and sensor position diversity, allowing for more observations of each derived location, at a cost of noise in the final point cloud.

A third product or service is a preparation of a point cloud database for searches, using both spatial and spectral information. Results of the data generation step can be stored for retrieval by query of a number of factors such as time, sensor, sensor type, geolocation, or target ID. The MySQL standard can be used.

A fourth product or service is an identification of non-Lambertian features, a creation of masks for change detection, and/or a quantification of degree of near-Lambertian features as a trendable metric. Once uniformly presented, the P3D derived digital pixel values can be analyzed as a consistent set. Analysis for non-Lambertian or man-made features can be performed with image to image point comparisons, both spatially and temporally. This can inform feature and mission specific tasking/collection.

A fifth product or service is an estimation of atmospherically corrected BRDF-like MASS from multi-image signatures and a population of a library. Relative pixel values can be aggregated and interpolated into bi-directional functions and stored with the dataset. A variety of units can be used, depending on the level of pre-processing performed.

A sixth product or service is SPARC sensor calibration (see FIG. 2) and BRDF-like characterization for a known class of materials in a controlled field measurement. Verification can be performed by collecting a SPARC calibration scene simultaneously with a group of known materials. BRDF-like MASS signatures generated in reflectivity are compared with lab models.

A seventh product or service is an evaluation of a P3D database such as a self-organizing map (SOM) baseline, its own library, or data compression artifact. The utility of multi-image signatures extracted from P3D processing can be explored as to NGA standards (MySQL database), and pixel/image processing can be eliminated.

It is noted that there is prior art directed to the use of BRDF (Non-Lambertian surfaces) for material ID and classification. However, the implementation of these multi-look analyses algorithms is both tedious, requiring the manual selection of pixels and multiple image to image registration steps, and is also prone to user error. Embodiments of the currently disclosed 3D point process offer a better way. Rather than working with several 2D images, non-Lambertian material ID will be substantially improved when committed to a 3D workflow. By directly interacting with a point cloud, analyst actions are reduced to selecting a single point or surface. Because the P3D process uses an N-image bundle adjust, every 3D point is directly associated with a reflectance value from each 2D image. This ensures, and automates, the association of a surface with multiple reflectance values from the 2D pixels in each image. Additionally, the 3D surface explicitly provides a surface orientation for this surface. In this workflow, the 2D datasets (line/sample and band reflectance values) can be considered metadata associated with each 3D point.

Figure 4:
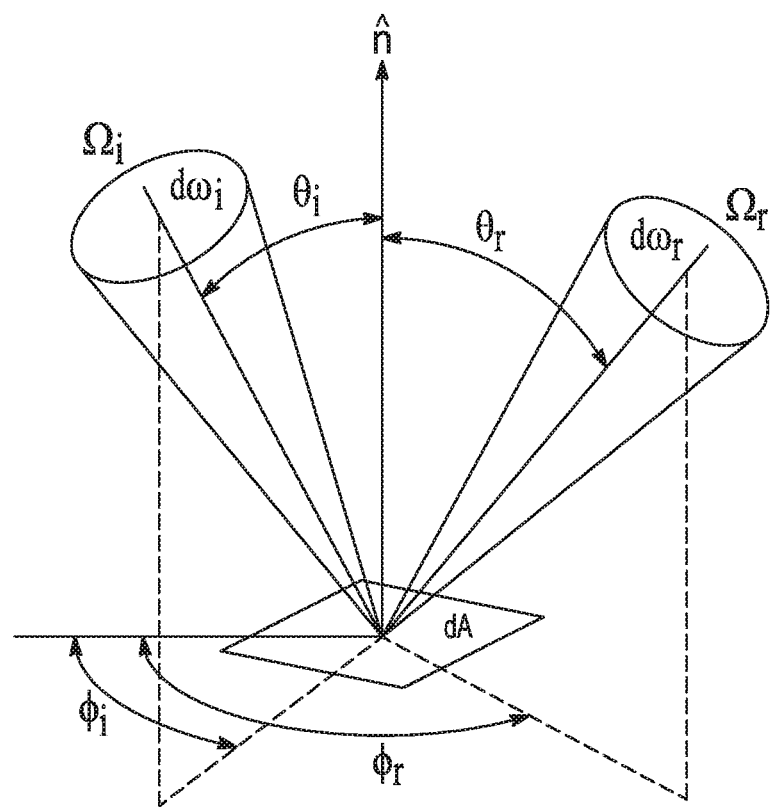
FIG. 4 illustrates the geometry relative to the surface normal for a bidirectional reflectance distribution function (BRDF), where the solid angles $\Omega_i$ and $\Omega r$ are for the sun and and sensor pixel instantaneous-field-of-view (IFOV) respectively, or a multi-angle surface-specific signature (MASS), where the solid angle $\Omega_i$ can include light from the entire hemisphere (including the sun) and $\Omega_r$ is the sensor pixel IFOV.

The following, in conjunction with FIG. 4, illustrates the process and geometry of the BRDF-like MASS signature for one or more embodiments. In FIG. 4 and the BRDF equation below, S is the solar radiance impinging upon the object of interest, and I is the reflected radiance off a natural flat horizontal surface. However, the following expression holds for the at sensor radiance and BRDF (at least on a clear day) of a SPARC reflectance target:

$$\rho(\theta_i, \theta_i; \theta_f, \phi_f) \equiv BRDF = \frac{S_0 \cos(\theta_i)}{I^\uparrow(\theta_r, \phi_r)} \text{ for a clear day.}$$

A convex mirror will reflect the solar irradiance and produce a star-like source with an intensity (sensor independent) determined as follows:

$$I(\lambda, \theta_r)_{TOA} = \frac{1}{4}\rho(\lambda, \theta_r)\tau_\downarrow(\lambda)\tau_\uparrow(\lambda)E_o(\lambda)R^2$$

Watts/(sr micron)/mirror

Based on the sensor's instantaneous-field-of-view, it will respond to the intensity source with at-Sensor Radiance/Mirror (sensor and collection geometry specific) given by:

$$L_{at-sensor}(\lambda, \theta_r) = \rho(\lambda, \theta_r)\tau_\downarrow(\lambda)\tau_\uparrow(\lambda)E_0(\lambda)\frac{R^2}{4GSD(x)GSD(y)}$$

Figure 5:
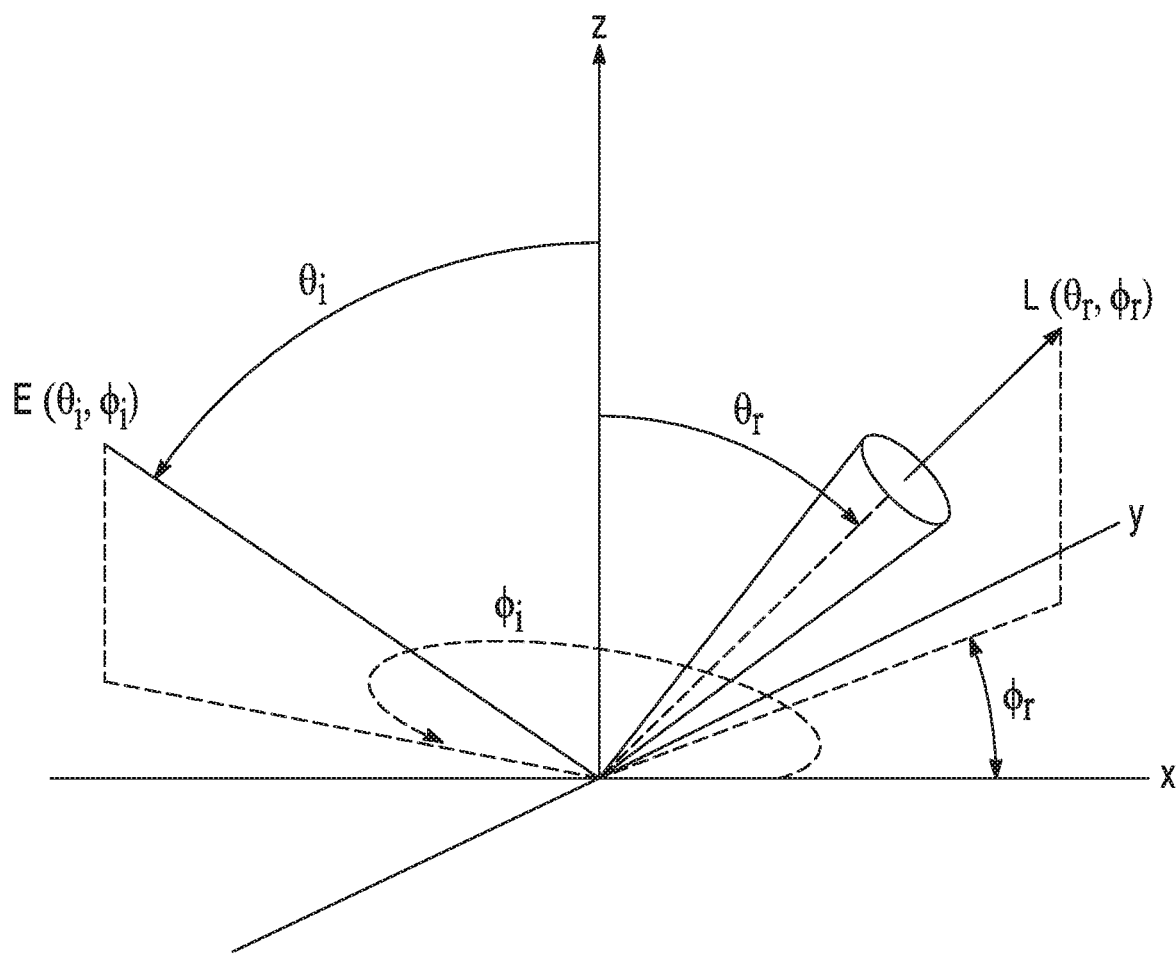
FIG. 5 illustrates a definition of a bidirectional reflectance distribution function (BRDF) and a multi-angle surface-specific signature (MASS) relative to the Earth geodetic model.

Watts/(m² sr micron)/mirror
$\rho(\pi,\theta_r)$=Mirror specular reflectance at the reflectance angle $\theta_r$
$\tau_\downarrow(\lambda)$=Sun to ground transmittance
$\tau_\uparrow(\lambda)$=Ground to sensor transmittance
$E_o(\lambda)$=Solar spectral constant
R=Mirror radius of curvature (m)
GSD=Line-of-site ground sample distance (m), cross-scan and along-sc The bi-directional reflectance distribution function is formally defined as the ratio of the reflected at-surface radiance to the at-surface incident irradiance as follows, and as illustrated in FIG. 5.

$$f_{BRDF}(\theta_i, \phi_i, \theta_r, \phi_r) = \frac{L(\theta_r, \phi_r)}{E(\theta_i, \phi_i)}[sr^{-1}]$$

Because targets in a SPARC system 200 of FIG. 2 are specular and spherical, and the upwelling radiance is dependent only on the sun as a point source, it holds that and the upwelling radiance and incident irradiance is azimuthally independent. As a result, the following holds:

$$f_{BRDF}^{SPARC}(\lambda, \theta_i) =$$

-continued $$\frac{\frac{NR^2}{4GSD(x)GSD(y)}\rho(\lambda,\theta_i)E_o(\lambda)\tau_\downarrow(\lambda)}{E_o(\lambda)\tau_\downarrow(\lambda)} = \frac{NR^2}{4GSD(x)GSD(y)}\rho(\lambda,\theta_i)$$

where N is the number of mirrors included in the SPARC target and the solar irradiance $E_o$ is not reduced by foreshortening because the mirror is spherical (cos $\theta_i$, term is left out). Thus the BRDF of a SPARC target, for an image with $\theta_i$, can be adjusted to any value by selecting the appropriate value of R (radius of curvature) or number of mirrors. On the ground, next to targets of interest for which the BRDF-like MASS values are desired, an array of SPARC reflectors of different intrinsic BRDF-like MASS values are set up (each with different R values).

$$\Sigma DN_{PSF}(SPARC)=DN/\text{pixel(diffuse)}$$

Figure 6:
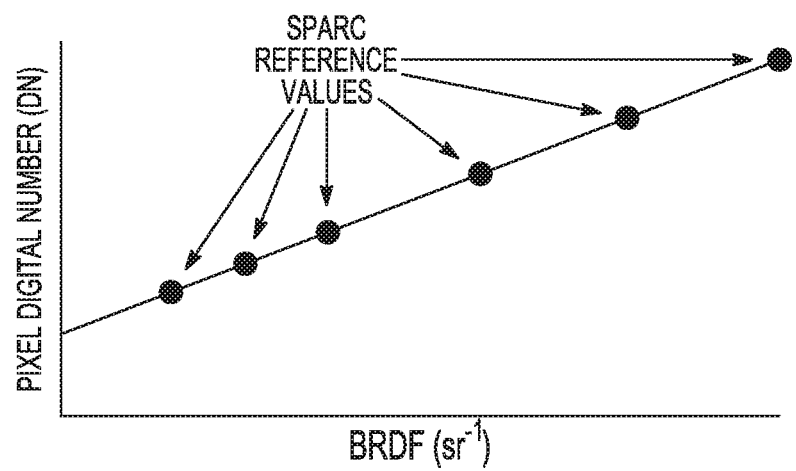
FIG. 6 illustrates atmospheric effects of a reflectance empirical line method.

Note that the equation above converts the specular reflectance, $\rho_m$, of the mirror(s) used in the SPARC target to an equivalent flat surface BRDF, $f_{BRDF}$, producing the identical DN response of the sensor to the SPARC target. The only caveat is that the DN response to the SPARC target is that the DN response is an integrated the pixels containing the SPARC target image profile. Because the SPARC targets appear as point like sources, the profile will look like the sensor point spread function (PSF). Once measured the SPARC integrated response is now known and will have a linear relationship with its calculated surface reflectance BRDF, $f_{BRDF}^{mirror}$, as is illustrated in FIG. 6. The result is a SPARC application of the empirical-line method (ELM). It provides the calibrated relationship converting image DN to surface reflectance for all pixels in a single image. Thus, SPARC targets can be used for transferring SPARC BRDF-like values to other in-scene adjacent targets of interest. The derived BRDF-like MASS is an at-surface value even though the DN values are based on an at-sensor radiance response. This bypasses atmospheric effects just like the reflectance empirical line method, as is illustrated in FIG. 6.

At-Surface BRDF-like MASS analysis of scene targets of interest derived from image data alone can be determined using SPARC targets as in-scene references.

Figure 7:
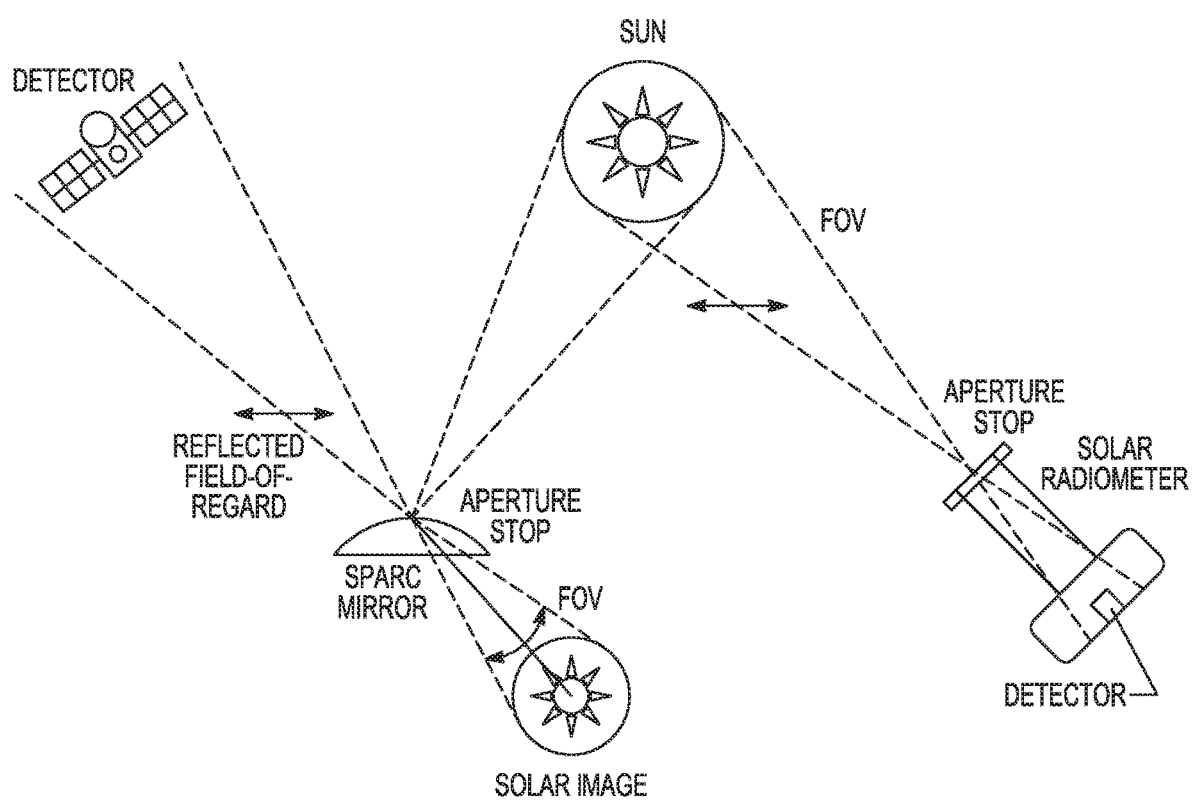
FIG. 7 illustrates another embodiment of a specular array for radiometric calibration ("SPARC") system.

The SPARC method allows any earth observing sensor to image the sun, just like a solar radiometer, and be calibrated directly to the solar spectral constant. The reflective Field-of-Regard for a mirror acts as a Field-of-View (FOV) aperture stop just as with an aperture stop on a typical sun photometer allowing the sun to be viewed directly as an absolute reference. The mirror also performs as an ideal neutral density filter. By selecting an appropriate radius of curvature of the mirror, the brightness of the target can be set at any intensity level in the sensor dynamic range while maintaining a constant upwelling spectral profile. A SPARC system calibrates sensors using point targets. A typical vicarious calibration uses large extended targets, which provides no insight into system response for small targets. The foregoing is illustrated in FIG. 7.

Figure 8A:
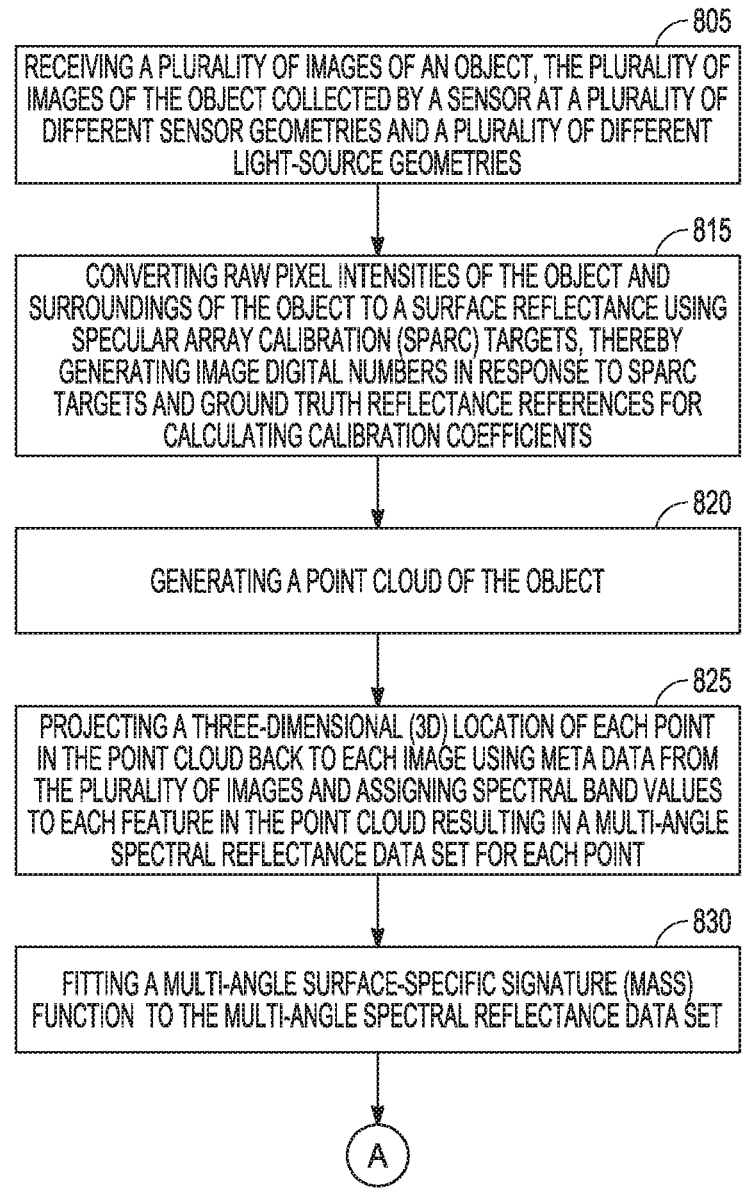
FIGS. 8A, 8B, and 8C are a block diagram of features and operations of a system for the generation and exploitation of an in-scene multi-angle surface-specific signature.
Figure 8B:
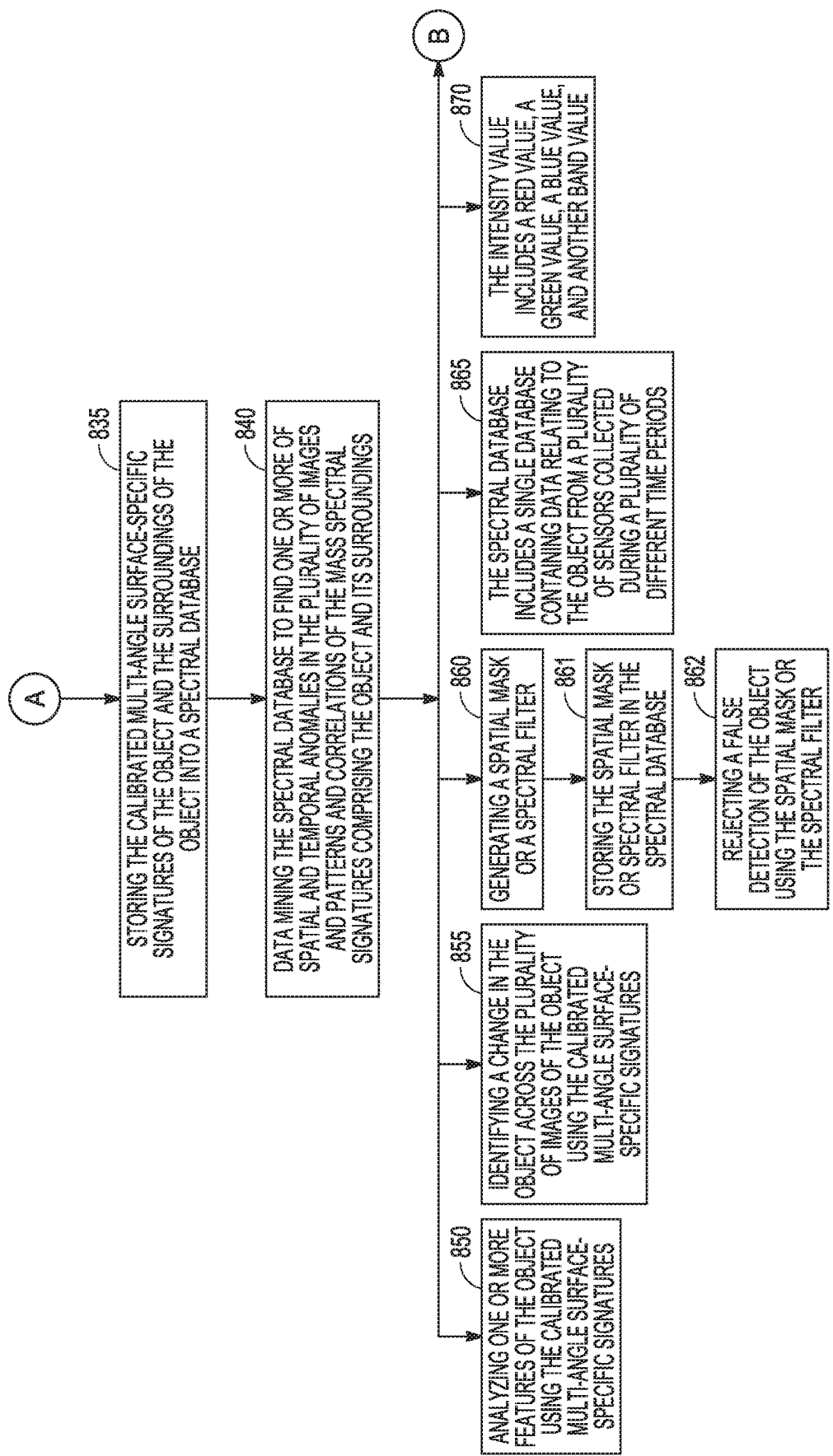
Figure 8C:
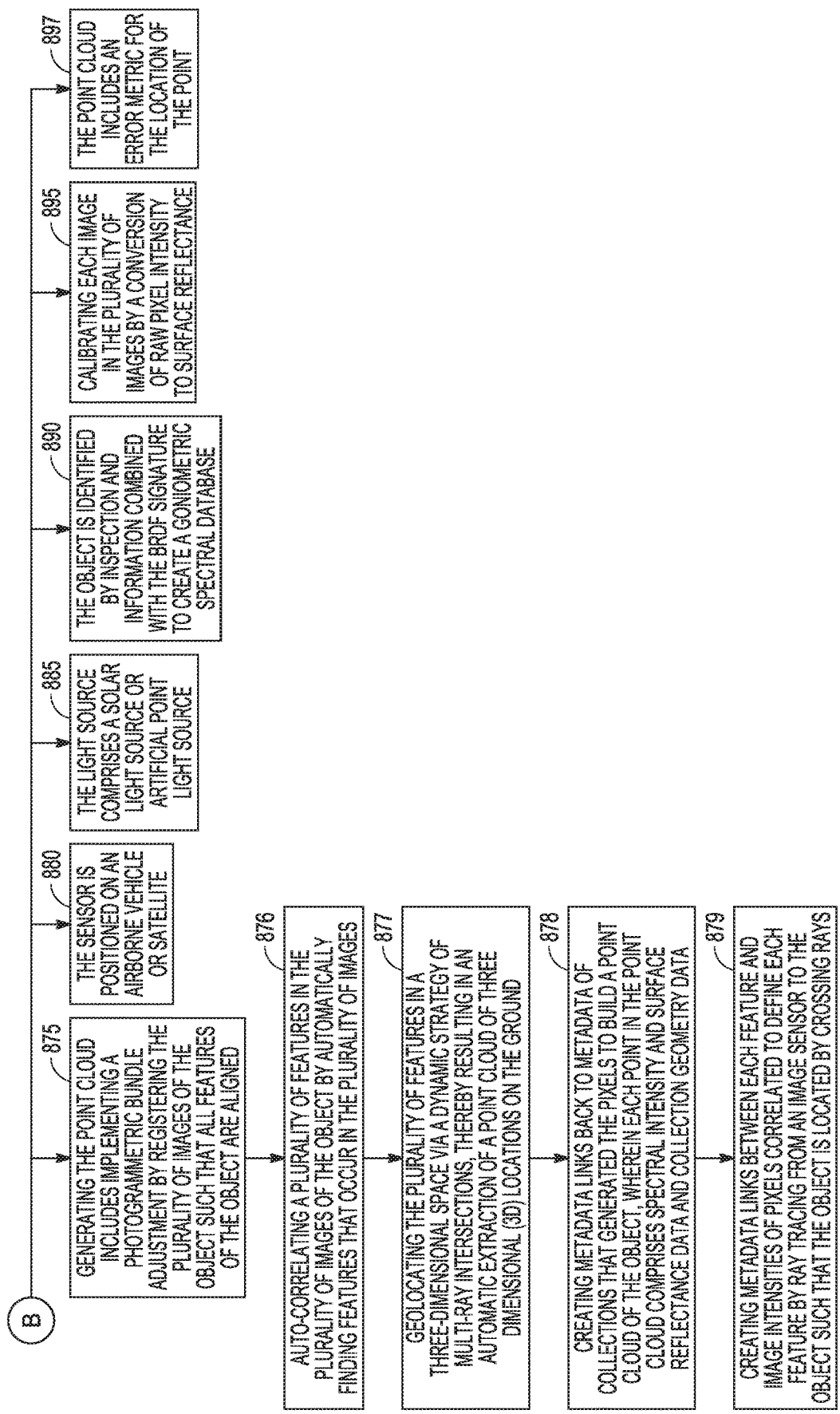

FIGS. 8A, 8B, and 8C are a block diagram illustrating operations and features of a method for measuring an angularly-dependent reflectance of a surface of an object. FIGS. 8A, 8B, and 8C include a number of process blocks 805-897. Though arranged substantially serially in the example of FIGS. 8A, 8B, and 8C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 8A, 8B, and 8C, at 805, a plurality of images of an object is received into an image sensing device and/or a processor that is associated with the image sensing device. The order of operations in 8A, 8B and 8C may be adjusted. For example, while not optimal, a point cloud might be generated before the day is calibrated. The plurality of images of the object are collected by the image sensing device at several different sensor geometries and several different light-source geometries. As indicated at 880, the image sensing device is positioned on an airborne vehicle or satellite, and as indicated at 885, the light source is the sun or an artificial point light source.

At 815, the DN raw pixel intensities of the object, and the surroundings of the object, are converted to radiance and/or a surface reflectance of the object. This conversion is accomplished with the SPARC process as disclosed above, and results in SPARC calibration coefficients.

At 820, a point cloud of the object is generated. As with any typical point cloud, the point cloud includes a location of a point and an error metric for the location of the point. Unlike typical point clouds, these point clouds, which as noted above can be referred to as P3D point clouds, also contain spectral band intensity values for the points, an azimuth and an elevation of the image sensing device, and an azimuth and an elevation of a light source, which in most cases is the sun. The order of steps 810 and 815 maybe reversed. As noted at 870, the spectral band intensity values can include a red value, a green value, a blue value, and another band value.

At 825, a three-dimensional (3D) location of each point in the point cloud is projected back to each image using metadata from the images. Spectral band values, which at this point include DNs and radiance and surface reflectance values at the image sensing device, are assigned to each feature in the point cloud. This assignment results in a multi-angle spectral reflectance data set for each point in the point cloud.

At 830, a multi-angle surface-specific signature (MASS) is fitted to the multi-angle spectral reflectance data set. As noted above, the BRDF is a subset of the MASS. The MASS will vary with each specific feature (or material) being imaged. The fitting of a BRDF-like mathematical function to the MASS can use standard mathematical tools for curve fitting, as well as physic models (like those created by Maxwell-Beard) that assist in the fitting of a laboratory measurements to a BRDF).

At 835, the multi-angle surface-specific signature of the object and the surroundings of the object are stored into a spectral database, and as indicated at 840, the spectral database is mined to find spatial and temporal anomalies in the images, and further to find patterns and correlations of the multi-angle surface-specific signature of the object and its surroundings. As noted above, this data mining can involve data science and artificial intelligence techniques.

At 850, features of the object are analyzed using the multi-angle surface specific signature, and at 855, a change in the object across the plurality of images of the object is identified using the multi-angle surface specific signature. This non-Lambertian signature is characteristic of man-made materials. This analyzing and identifying once again involve the use of machine learning and intelligence techniques.

False detections of the object can also be detected. Specifically, at 860, a spatial mask or a spectral filter is generated. At 861, the spatial mask or spectral filter is stored in the spectral database. At 862, a false detection of the object is rejected using the spatial mask or the spectral filter.

At 865, the spectral database is a single database that contains data relating to the object from several image sensing devices collected during several different time periods. This is made possible by the calibrating, converting, projecting, and fitting steps outlined above, such that the data are in one database and calibrated, converted, projected, and fitted to permit data science analyses.

At 875, a photogrammetric bundle adjustment is implemented by registering the images of the object such that all features of the object are aligned. At 876, features in the images of the object are auto-correlated by automatically finding features that occur in the images. The process basically identifies objects from different images that are the same and shifts the pixels of that same object observed in different images so that they line up. At 877, the features are geolocated in a three-dimensional space via a dynamic strategy of multi-ray intersections. This results in an automatic extraction of a point cloud of three dimensional (3D) locations on the ground. At 878, metadata links are created between each feature, and image intensities of pixels are correlated to define each feature by ray tracing from an image sensor to the object such that the object is located by crossing rays. At 879, metadata links are back to metadata of image collections that generated the pixels to build a point cloud of the object. Each point in the point cloud includes spectral intensity and surface reflectance data and collection geometry data.

At 890, the object is identified by inspection and information combined with the multi-angle surface-specific signature to create a goniometric spectral database.

At 895, each image in the plurality of images is calibrated by a conversion of raw pixel intensity to a surface reflectance for each image. The raw pixel intensity is a digital number (DN), which represents the sensor's DN detector response to the target of interest. The at-sensor radiation equation above converts raw pixel intensities to radiance, and the SPARC process allows one to go from radiance to surface reflectance.

At 897, the point cloud includes an error metric for the location of the points in the point cloud.

Figure 9:
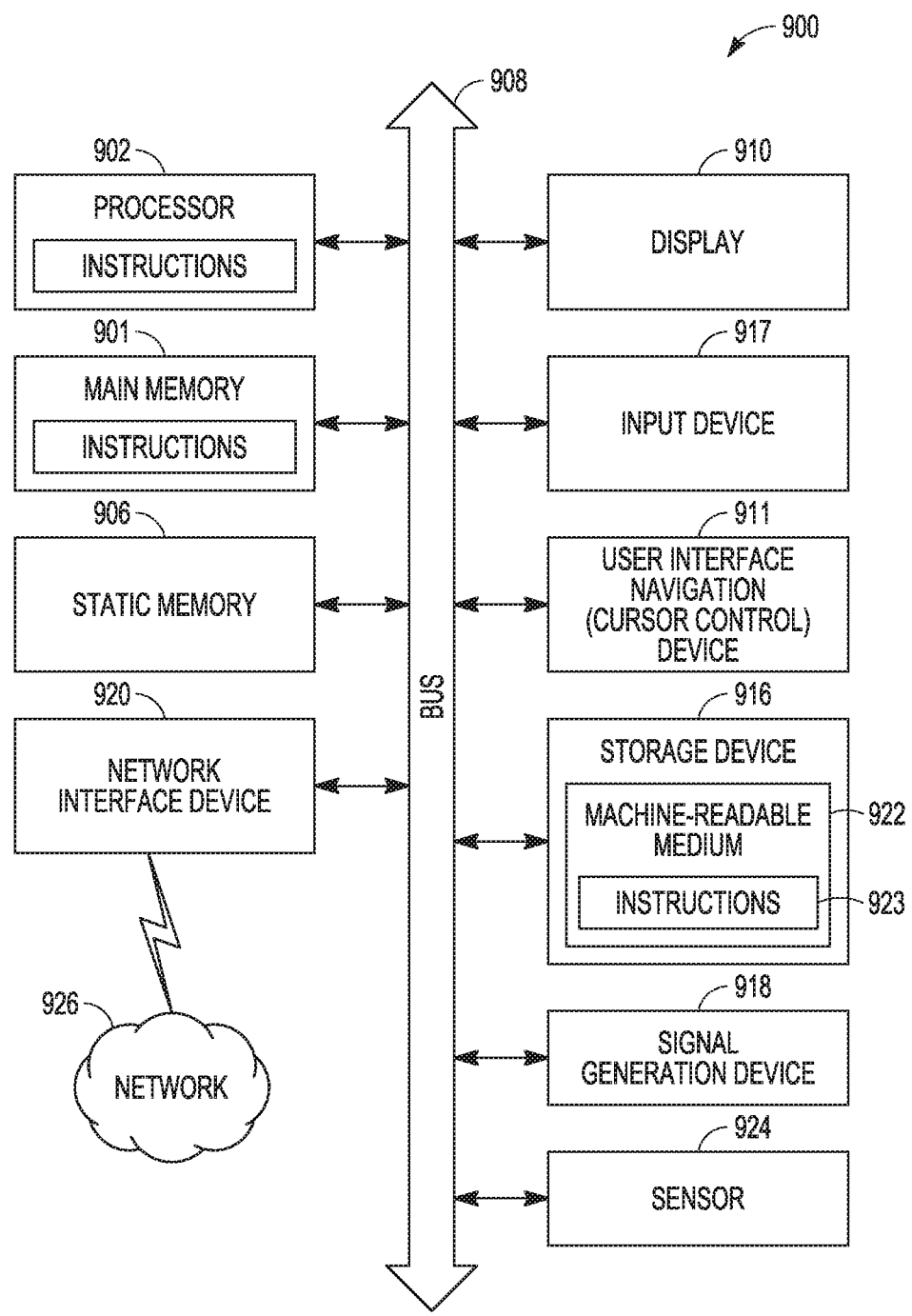
FIG. 9 is a block diagram of a computer system upon which one or more of the embodiments disclosed herein can execute.

FIG. 9 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a display unit 910, an alphanumeric input device 917 (e.g., a keyboard), and a user interface (UI) navigation device 911 (e.g., a mouse). In one embodiment, the display, input device and cursor control device are a touch screen display. The computer system 900 may additionally include a storage device 916 (e.g., drive unit), a signal generation device 918 (e.g., a speaker), a network interface device 920, and one or more sensors 921, such as a global positioning system sensor, compass, accelerometer, or other sensor.

The drive unit 916 includes a machine-readable medium 922 on which is stored one or more sets of instructions and data structures (e.g., software 923) embodying or utilized by any one or more of the methodologies or functions described herein. The software 923 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 923 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

What is claimed is:

1. A method for measuring an angularly-dependent reflectance of a surface of an object, comprising:
   receiving a plurality of images of the object, the plurality of images of the object collected by a sensor at a plurality of different sensor geometries and a plurality of different light-source geometries;
   generating a point cloud of the object, wherein the point cloud comprises locations of a plurality of points derived via a multi-ray intersection of features found in the plurality of images using a feature correlator, spectral band intensity values for the points, an azimuth and an elevation of the sensor, and an azimuth and an elevation of a light source;
   converting raw pixel intensities of the object and surroundings of the object to a surface reflectance of the object using specular array calibration (SPARC) targets;
   projecting a three-dimensional (3D) location of each point in the point cloud back to each image of the plurality of images using metadata from the plurality of images, and assigning spectral band values to each feature in the point cloud, thereby resulting in a multi-angle spectral reflectance data set for each point in the point cloud;
   fitting a multi-angle surface-specific signature (MASS) to the multi-angle spectral reflectance data set;
   storing the multi-angle surface-specific signature of the object and the surroundings of the object into a spectral database; and
   data mining the spectral database to find one or more of spatial and temporal anomalies in the plurality of images and patterns and correlations of the multi-angle surface-specific signature.

2. The method of claim 1, comprising analyzing one or more features of the object using the multi-angle surface-specific signature.

3. The method of claim 1, comprising identifying a change in the object across the plurality of images of the object using the multi-angle surface-specific signature.

4. The method of claim 1, comprising:
   generating a spatial mask or a spectral filter;
   storing the spatial mask or spectral filter in the spectral database; and
   rejecting a false detection of the object using the spatial mask or the spectral filter.

5. The method of claim 1, wherein the database comprises a single database containing data relating to the object from a plurality of sensors collected during a plurality of different time periods.

6. The method of claim 1, wherein the spectral band intensity values comprise a red value, a green value, a blue value, and another band value.

7. The method of claim 1, wherein the generating the point cloud comprises:
   implementing a photogrammetric bundle adjustment by registering the plurality of images of the object such that all features of the object are aligned;
   auto-correlating a plurality of features in the plurality of images of the object by automatically finding features that occur in the plurality of images;
   geolocating the plurality of features in a three-dimensional space via a dynamic strategy of multi-ray intersections, thereby resulting in an automatic extraction of a point cloud of three dimensional (3D) locations on the ground;
   creating first metadata links between each feature and image intensities of pixels correlated to define each feature by ray tracing from the sensor to the object such that the object is located by crossing rays; and
   creating second metadata links back to metadata of image collections that generated the pixels to build a point cloud of the object, wherein each point in the point cloud comprises spectral intensity and surface reflectance data and collection geometry data.

8. The method of claim 1, wherein the sensor is positioned on an airborne vehicle or satellite.

9. The method of claim 1, wherein the light source comprises a solar light source or an artificial point light source.

10. The method of claim 1, wherein the object is identified by inspection and information combined with the multi-angle surface-specific signature to create a goniometric spectral database.

11. The method of claim 1, comprising analyzing the spectral database via a machine learning process.

12. The method of claim 1, comprising calibrating each image in the plurality of images by a conversion of raw pixel intensity to a surface reflectance for each image.

13. The method of claim 1, wherein the point cloud comprises an error metric for the locations of the plurality of points.

14. A non-transitory computer readable medium comprising instructions that when executed by a processor executes a process comprising:
   receiving a plurality of images of the object, the plurality of images of the object collected by a sensor at a plurality of different sensor geometries and a plurality of different light-source geometries;
   generating a point cloud of the object, wherein the point cloud comprises locations of a plurality of points derived via a multi-ray intersection of features found in the plurality of images using a feature correlator, spectral band intensity values for the points, an azimuth and an elevation of the sensor, and an azimuth and an elevation of a light source;
   converting raw pixel intensities of the object and surroundings of the object to a surface reflectance of the object using specular array calibration (SPARC) targets;
   projecting a three-dimensional (3D) location of each point in the point cloud back to each image of the plurality of images using metadata from the plurality of images, and assigning spectral band values to each feature in the point cloud, thereby resulting in a multi-angle spectral reflectance data set for each point in the point cloud;
   fitting a multi-angle surface-specific signature (MASS) to the multi-angle spectral reflectance data set;
   storing the multi-angle surface-specific signature of the object and the surroundings of the object into a spectral database; and data mining the spectral database to find one or more of spatial and temporal anomalies in the plurality of images and patterns and correlations of the multi-angle surface-specific signature.

15. The non-transitory computer readable medium of claim 14, comprising instructions for analyzing one or more features of the object using the multi-angle surface-specific signature.

16. The non-transitory computer readable medium of claim 14, comprising instructions for identifying a change in the object across the plurality of images of the object using the multi-angle surface-specific signature.

17. The non-transitory computer readable medium of claim 14, comprising instructions for:
- implementing a photogrammetric bundle adjustment by registering the plurality of images of the object such that all features of the object are aligned;
- auto-correlating a plurality of features in the plurality of images of the object by automatically finding features that occur in the plurality of images;
- geolocating the plurality of features in a three-dimensional space via a dynamic strategy of multi-ray intersections, thereby resulting in an automatic extraction of a point cloud of three dimensional (3D) locations on the ground;
- creating first metadata links between each feature and image intensities of pixels correlated to define each feature by ray tracing from the sensor to the object such that the object is located by crossing rays; and
- creating second metadata links back to metadata of image collections that generated the pixels to build a point cloud of the object, wherein each point in the point cloud comprises spectral intensity and surface reflectance data and collection geometry data.

18. The non-transitory computer readable medium of claim 14, comprising instructions for analyzing the spectral database via a machine learning process.

19. The non-transitory computer readable medium of claim 14, comprising instructions for calibrating each image in the plurality of images by a conversion of raw pixel intensity to a surface reflectance for each image.

20. A system comprising:
- a computer processor; and
- a computer readable medium coupled to the computer processor;
- wherein the computer processor is operable to execute a process comprising:
- receiving a plurality of images of the object, the plurality of images of the object collected by a sensor at a plurality of different sensor geometries and a plurality of different light-source geometries;
- generating a point cloud of the object, wherein the point cloud comprises locations of a plurality of points derived via a multi-ray intersection of features found in the plurality of images using a feature correlator, spectral band intensity values for the points, an azimuth and an elevation of the sensor, and an azimuth and an elevation of a light source;
- converting raw pixel intensities of the object and surroundings of the object to a surface reflectance of the object using specular array calibration (SPARC) targets;
- projecting a three-dimensional (3D) location of each point in the point cloud back to each image of the plurality of images using metadata from the plurality of images, and assigning spectral band values to each feature in the point cloud, thereby resulting in a multi-angle spectral reflectance data set for each point in the point cloud;
- fitting a multi-angle surface-specific signature (MASS) to the multi-angle spectral reflectance data set; and
- storing the multi-angle surface-specific signature of the object and the surroundings of the object into a spectral database.

* * * * *

UNITED STATES PATENT AND TRADEMARK OFFICE
CERTIFICATE OF CORRECTION

PATENT NO. : 11,010,639 B2  
APPLICATION NO. : 16/279212  
DATED : May 18, 2021  
INVENTOR(S) : Coogan et al.

Page 1 of 1

It is certified that error appears in the above-identified patent and that said Letters Patent is hereby corrected as shown below:

In the Specification

In Column 1, Line 59, delete "Sentinal-2A" and insert --Sentinel-2A-- therefor

In Column 1, Lines 60-61, delete "Sentinal-2A" and insert --Sentinel-2A-- therefor In Column 2, Lines 62, delete "Ωr" and insert --$\Omega_r$-- therefor In Column 2, Lines 63, delete "and and" and insert --and-- therefor In Column 9, Line 24, delete "Euclidian" and insert --Euclidean-- therefor In Column 10, Line 30, delete "IC." and insert --1C.-- therefor In Column 14, Lines 18-19, delete "$\rho(\theta_i, \theta_i; \theta_f, \phi_f) = BRDF = \frac{S_0 \cos(\theta_i)}{\Gamma(\theta_r, \phi_r)}$ for a clear day" and insert --$\rho(\theta_i, \phi_i; \theta_f, \phi_f) = BRDF = \frac{S_0 \cos(\theta_i)}{\Gamma(\theta_r, \phi_r)}$ for a clear day-- therefor In Column 14, Line 41, delete "ρ(π,θ_r)=Mirror" and insert --$\rho\ (\lambda,\theta_r) = $ Mirror-- therefor In Column 18, Line 14, delete "921," and insert --924,-- therefor Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*